United States Patent Office 2,727,914
Patented Dec. 20, 1955

2,727,914

RICE BRAN OIL EXTRACTION PROCESS

Edward A. Gastrock, Henry L. E. Vix, Esler L. D'Aquin, Angelo V. Graci, Jr., and James J. Spadaro, New Orleans, La., assignors to the United States of America as represented by the Secretary of Agriculture No Drawing. Application October 10, 1952,
Serial No. 314,234

3 Claims. (Cl. 260—412.4)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This application is a continuation in part of our application, Serial No. 276,026, filed March 11, 1952.

This invention relates to the solvent extraction of rice bran oil from rice bran. More particularly the invention provides a process of preparing rice bran for solvent extraction which involves subjecting the rice bran to a mild heat treatment which is sufficient to make the oil easily extractable but insufficient to seriously damage protein. This heat treatment is followed by a crisping treatment which is a partially dehydrative cooling of the cooked rice bran and which agglomerates the particles of the bran into relatively large porous and incompressible granules which tend to remain in this form on the bed of a filter. In addition, the invention also provides a continuous rice bran solvent extraction process in which the rice bran which has been so heat-treated and crisped is countercurrently contacted with substantially separate portions of solvents while it is supported on the bed of a continuous filter, and the residual solids removed from each portion of solvent by filtration.

Solvent extraction has been reported to be the most promising method for removing oil from rice bran since the bran is bulky and usually contains less than about 18% of oil.

The presence of excess amounts of fines in rice bran causes much difficulty in extracting the oil from the bran and in filtering the miscellas. In some cases it has been found necessary to operate extraction units below their rated capacities because of filtration difficulties, and in other cases it has been necessary to screen out a portion of the fines prior to extraction (in at least one mill over 25% of the bran is removed as fines) thus decreasing their production of oil by a similar amount. In a series of pilot plant extractions of rice bran operations to simulate commercial processing conditions, the fines were found to consist of 28.4% of particles that would pass a 300 mesh screen.

In accordance with the process of this invention, rice brans are heat treated by the conjoint application of Steps I and II described below. Rice brans are solvent extracted in accordance with this invention by a conjoint application of Steps I, II and III described below.

I. *Mild cooking.*—The rice bran particles are cooked while controlling their moisture content so that at least in an early stage of the cooking operation the particles contain between about 14 to 26% moisture. (Throughout this specification, percentages of constituents are calculated on an "as is" basis.) The rice bran particles are cooked for an overall time of from 15 to 70 minutes, with their moisture content being allowed to decrease from a relatively high level in the early stages of the cooking operation to from about 6 to 18% in the final stages. The cooking temperature is increased from a temperature between about 170 and 210° F. in the early stages of the cooking operation to a temperature of not more than about 235° F. in the final stage.

II. *Crisping.*—The resultant cooked rice bran particles are exposed to a relatively cool atmosphere conducive to the evaporation of moisture until they undergo a substantially uniform decrease in temperature to below about 130° F., and a substantially uniform loss of moisture sufficient to lower their moisture content by from about 2 to 4%.

III. *Filtration-extraction.*—The resultant cooked and crisped rice bran particles are mixed with a solvent for rice bran oil (since some of the rice bran oil dissolves, this produces a slurry consisting of solid particles of partially de-oiled rice bran mixed with a miscella). The resulting slurry is filtered in a layer of not more than about 7 inches in thickness (i. e., a cake thickness of less than about 7 inches) upon a filtering medium having a porosity equivalent in proportion of solids retained and rate of liquid passage to a filtering medium consisting of a standard mesh screen of from about 80 to 300 mesh. The mixing and filtering is repeated a plurality of times using solvents containing successively smaller proportions of rice bran oil.

The moisture content of rice bran particles extracted by the process of this invention can be controlled so that at least at the early stage of the cooking operation the particles contain between about 14 to 26% moisture, and preferably contain from about 20 to 25% moisture: by using a rice bran having such a moisture content; by adjusting the moisture content of the rice bran particles to within such limits prior to the cooking operation; by adjusting the moisture content of the rice bran particles to within such limits within about the first quarter of the cooking operation; and by adjusting the moisture content during the conductance of one or more steps so that the specific limits are attained within about the first quarter of the cooking operation. An alteration of the moisture content, where required, can be accomplished by the conventional methods of dipping, spraying, steaming, air drying and the like. It is generally preferable to make any necessary adjustments of the moisture content during the first quarter of the cooking operation.

The mild cooking of the particles is preferably conducted in a plurality of stages in which the particles are agitated for substantially equal periods. The particles are preferably heated to progressively higher temperatures. The flakes are preferably heated to from about 190° F. in the first stage, and held there for about 10 to 15 minutes. If an adjustment of the moisture content is necessary it is preferably made while the particles are in the first stage. The particles are then held for about an equal time in 3 or 4 additional stages in which their temperature is increased in successive increments to about 220° F. while the moisture content is decreased to from about 14–17%.

The hot cooked particles are preferably crisped by subjecting them to a gentle agitation exposing as much surface as possible to a cooling and drying atmosphere until their present total moisture content has been lowered by about 2.5% while their temperature has been lowered to below about 130° F. The crisping can be conducted by forcing any non-reactive relatively dry and cool gas into intimate contact with the surfaces of the hot cooked rice bran particles. Agitating the particles on conventional tray driers or open conveyors, or forcing air through one space of a cooking vessel, such as a conventional stack cooker, constitute preferred methods of conducting the crisping operation.

An unobvious advantage of the moisture controlled heat treating step, the conjoint mild cooking and crisping Steps I and II above is that by virtue of the physical properties imparted to the rice bran particles which are so treated, these steps can be accomplished in conventional oilseed cookers and rather than increasing the fines problem these steps so conducted reduce the fines problem. As is known to those skilled in the art, because of the low thermal conductivity of oilseed and the like particles, in order to prevent localized overheating, such particles are agitated while they are being heated in the conventional oilseed cookers.

Generally rice bran is not cooked prior to solvent extraction, but when rice bran was cooked in the conventional manner in a conventional oilseed cooker it was found that the action of the agitators of the cooker tended to reduce the easily crumbled rice bran and to produce an excessive amount of fines.

However, in the present mild cooking operation, a relatively low temperature is applied for a relatively short time during which the moisture content of the particles is at a relatively high level in the early stages and is decreased during the operation. In such a cooking operation the fine particles appear to agglomerate into larger particles. The crisping operation appears to remove enough water from such particles to markedly increase the porosity and structural strength of their surfaces. The particles produced by the combined operations are relatively large, porous, and incompressible.

Substantially any of the conventionally used oilseed extraction solvents can be employed as the solvent with which the mildly cooked and crisped particles are extracted in accordance with the process of the present invention. The commercial hexanes, the methylpentanes, and trichloroethylene are particularly suitable. While the solvent first mixed with such particles can contain from 0 to about 15% of rice bran oil, miscellas containing from about 4 to 10% rice bran oil are particularly suitable. The amount of solvent to be used in any particular case is principally a matter of economics, particularly in respect to the upper limits. The considerations involved in using more solvent to obtain efficient extraction and the added expense that this introduces in solvent recovery are well known to those skilled in the art. However, the present process can be conducted with as little as 0.7 part by weight of the solvent (based on hexane) being used per part of rice bran particles. The present process is preferably conducted by using about 1 part of solvent per part of rice bran particles. This is only about one-half of the amount of solvent usually used in the present commercial processes of solvent extracting unpressed rice bran particles.

An agitation of the mixture of rice bran particles with the initial portion of solvent (which preferably is a miscella) can be accomplished by the conventional procedures for intimately mixing solids with a liquid. The use of a conveyor with paddle-type blades set to provide gentle agitation as well as to convey has been found to be particularly suitable. As will be apparent to those skilled in the art, the time for which the prepared rice bran particles are agitated in the initial portion of solvent with which they are mixed can be varied widely depending upon the concentration desired for the miscella sent to the oil recovery system, the number of portions of solvent with which each portion of meal is to be mixed, the temperature of slurry mixtures and the like factors. The use of times of from about 10 to 20 minutes is preferred.

The slurries produced in conducting the process of this investigation can be filtered using substantially any type of a continuous or non-continuous filter. The use of a continuous horizontal vacuum filter having a plurality of spaces in which a substance supported on the filtering medium can be substantially separately mixed with liquids and filtered to yield separate filtrates has been found to be particularly suitable. Where the liquid removal is not aided by reduced pressure the use of a filtering apparatus fitted with a means of agitating the filtering medium is preferred.

Although the filtration-extraction process provided by this invention can be conducted in a batch-wise manner using non-continuous filters, continuous operation is preferred.

The filter medium can be any type of a filter medium. Whether or not a given filter medium can be used can readily be determined by comparing the filtration characteristics of that filter medium with those of filter mediums consisting of standard mesh wire screen of from 80 to 300 mesh in the filtration of a slurry prepared in accordance with the process of this invention. If the filter medium being tested exhibits a rate of miscella flow and a proportion of fines passed through substantially equal to those exhibited by one of those standard screens, the medium being tested can be used. Screens or cloth filter mediums composed of non-porous strands are preferred. Filter screens with a twilled Dutch weave, in the form of 20 by 250 mesh screens composed of wires of 0.0016 inch in diameter, and with plain Dutch weave, in the form of 24 by 110 mesh screens composed of wires of 0.0045 inch in diameter have been found to be particularly suitable.

In a preferred mode of operation, in countercurrently contacting the heat treated rice bran particles with substantially separate portions of solvent while the particles are supported on the bed of a continuous filter, a stream of gas or liquid is forced up through the bed of the filter directly beneath the spot where the slurry of the particles is deposited. This operation dislodges any fines which may have been trapped in the filter bed and disperses them uniformly within the slurry. This "blowback" stream can suitably be a stream of an inert gas such as nitrogen, stack gases, hexane vapors, hexane saturated air, or even a stream of liquid miscella.

The following experimental results illustrate certain features involved in the practice of this invention.

*Example I*

Rice bran from standard milled rice having particle sizes ranging from 0.2% on 8 mesh to 9.6% through 300 mesh, containing 15.2% lipids and 11.5% moisture was heated to about 208° F. in the first ring of a ring-type stack cooker. The moisture content was raised to about 25.9% while the bran was agitated in this ring. After about 12 minutes the bran was advanced to a lower ring and heated to about 215° F. while the moisture content was allowed to decrease so that by the time the bran had been heated in three additional rings to respectively about 216, 216 and 218° F. for about the same length of time in each ring, the moisture was reduced to about 17%.

The resultant mildly cooked material was crisped by spreading it in layers about 1½ inches deep on the trays of a conventional air drier and gently agitating the hot cooked material until its temperature was lowered to about 130° F. and its moisture content was lowered to about 14.0%.

The resultant particles were continuously countercurrently extracted with hexane in an amount of 1 part per part of starting material. In conducting the extraction, the initial mixture of particles and solvent (a hexane miscella containing about 9% oil) was agitated in a paddle-type mixing conveyor for about 20 minutes. The resulting slurry was spread to a cake thickness of about 1½ inches on the filter medium of a continuous rotary horizontal vacuum filter, fitted with a filter medium consisting of a 24 by 110 mesh Dutch weave wire screen composed of wires having a diameter of 0.0045 inch and fitted with a plurality of spaces in which the particles could be substantially separately mixed with liquids and filtered to yield separate filtrates. The filtrations were conducted using a reduced pressure equivalent to 645 mm. of mercury absolute pressure, and the overall filtration rate was 10 pounds of liquid per square foot per minute. Four such filtrates were obtained and the miscella comprising the first filtrate was sent to the oil recovery system where the solvent was separated from the crude rice bran oil and recycled to the filter medium for reuse. The second filtrate was recycled to the paddle-type mixing conveyer for reslurrying with the bran particles, while the third and fourth filtrates were recycled to the filter medium for reuse of the solvent. The resulting solvent wet meal was sent to the desolventizers where it was desolventized to obtain a dried meal while the solvent separated therefrom was recycled to the filter medium for reuse.

The miscella sent to the oil recovery system contained 15% oil and 0.5% solid meal particles. The extracted cake contained 28.8% residual solvent, and the desolventized cake contained 1.2% lipids, and had a soluble nitrogen content of 13%, and a thiamin content of 23.3 parts per million. The crude oil refined by conventional methods to a photometric color of 4.3 red, and bleached to a photometric color of 3.2 red.

*Example II*

The importance of the mild cooking and crisping operations is demonstrated by the fact that when rice bran particles analogous to those used in Example I but having a moisture content of 8.0% were directly subjected to an entirely analogous filtration extraction: the filtration rate was impractically low, 0.6 pound of filtrate per square foot per minute using a cake thickness of 2 inches and a reduced pressure equivalent to 210 mms. of mercury absolute pressure; the proportion of residual solvent in the extracted cake was relatively high for the reduced pressure used, 41.6%; and the proportion of residual liquids was high, 1.8%.

*Example III*

Applicability of the process to a rice bran differing physically from bran from standard milled rice in that it contains a very high proportion of rice polish which consists of very fine particles, is demonstrated by the fact that when rice bran having a particle size range from 2% on 20 mesh to 28.4% through 300 mesh and containing 18.0% lipids and 7.0% moisture was cooked in a manner analogous to that of Example I and the cooled and cooked particles were subjected to an analogous filtration extraction: the vacuum required was equivalent to a reduced pressure equivalent to 680 mm. of mercury absolute pressure, and the overall filtration rate was about 10 pounds of liquid per square foot per minute; the miscella sent to the oil recovery system contained 13.4% oil and 2.2% solid meal particles; the extracted cake contained 42.2% residual solvent, and the desolventized cake contained 1.4% lipids. The crude oil refined to a photometric color of 6.5 red and bleached to a photometric color of 3.6 red.

We claim:

1. A process of extracting rice bran oil from the rice bran which comprises: mildly cooking rice bran while controlling the moisture content so that in the early stages of the cooking the rice bran particles contain from about 14 to 26% moisture and in the final stages of the cooking they contain from about 6 to 18% moisture, using an overall time of from about 15 to 70 minutes and increasing the cooking temperature from an initial temperature of from about 170 to 210° F. to a final temperature of less than about 235° F., crisping the cooked particles by exposing them to a relatively cool atmosphere conducive to the evaporation of moisture until they undergo a substantially uniform decrease in temperature to below about 130° F. and a substantially uniform loss of moisture sufficient to lower their moisture content by from about 2 to 4%; and mixing the so prepared rice bran particles with a solvent for rice bran oil, subjecting the resultant slurry to filtration using a cake thickness of less than about 7 inches and a filter medium having a porosity equivalent in proportion of solids retained and rate of liquid passage to a filter medium consisting of a standard mesh screen of from about 80 to 300 mesh, and repeating the mixing with solvent and the filtering a plurality of times.

2. The process of claim 1 in which the solvent used is hexane.

3. A process of solvent extracting rice bran oil from rice bran particles which comprises: heating the bran in a plurality of stages by agitating the bran for from about 10 to 15 minutes in each of a plurality of stages maintained at successively increased temperatures, raising the moisture content of the bran to from about 20 to 26% in the first stage while raising their temperature to about 208° F., and lowering the moisture content of the bran to a final moisture content of about 14 to 17% while raising their temperature to a final temperature of about 220° F.; gently agitating a relatively thin layer of the cooked bran particles until their moisture content is about 12 to 14% and their temperature is below about 130° F. to crisp them; mixing the cooked and crisped rice bran particles with a solvent for rice bran oil; subjecting the resultant slurry to a vacuum filtration, using a cake thickness of less than about 7 inches and a filter medium having a porosity equivalent in proportion of solids retained and rate of liquid passage to a filter medium consisting of a standard mesh screen of from about 80 to 300 mesh; and repeating the mixing with solvent and the filtering a plurality of times.

References Cited in the file of this patent

UNITED STATES PATENTS

| Number | Name | Date |
|---|---|---|
| 2,253,696 | Fauth | Aug. 26, 1941 |
| 2,448,729 | Ozai-Durrani | Sept. 7, 1948 |
| 2,551,254 | Dunning | May 1, 1951 |
| 2,594,117 | Bonotto | Apr. 22, 1952 |
| 2,629,722 | Dunning | Feb. 24, 1953 |